United States Patent Office
3,532,749
Patented Oct. 6, 1970

3,532,749
N'-PROPARGYL-N²-CYCLOPROPYL-ETHYLENE-
DIAMINES AND THE SALTS THEREOF
John H. Biel and Edward J. Warawa, Milwaukee, Wis.,
assignors to Aldrich Chemical Company, Inc., Milwaukee, Wis., a corporation of Wisconsin
No Drawing. Application May 11, 1962, Ser. No. 454,972,
now Patent No. 3,365,458, dated Jan. 23, 1968, which
is a continuation-in-part of application Ser. No. 377,387,
June 23, 1964. Divided and this application Sept. 29,
1967, Ser. No. 671,621
Int. Cl. C07c 87/28, 87/36
U.S. Cl. 260—563                                    10 Claims

ABSTRACT OF THE DISCLOSURE

N'-cyclopropyl ethylenediamine derivatives and the pharmaceutically acceptable nontoxic salts thereof are useful as antidepressants and monoamine oxidase inhibitors in mammals.

CROSS-REFERENCE TO RELATED APPLICATIONS

This application is a divisional application of application Ser. No. 454,972, filed May 11, 1965, and now U.S. Pat. No. 3,365,458, which is a continuation-in-part of now abandoned application Ser. No. 377,387, filed June 23, 1964.

BACKGROUND OF THE INVENTION

Field of the invention

This invention relates to novel compounds. More particularly, this invention relates to novel compounds which possess valuable therapeutic utility as antidepressants and monoamine oxidase inhibitors, and to intermediates useful in the preparation thereof. In another aspect, this invention relates to a novel method of treating depression.

Description of the prior art

There exists a need to provide additional agents useful as antidepressants and monoamine oxidase inhibitors. Thus, it is an object of this invention to provide a new class of compounds having antidepressant activity. Another object of the present invention is to provide novel compounds which inhibit the enzyme monoamine oxidase. It is a still further object of the present invention to provide a novel method of treating depression.

SUMMARY OF THE INVENTION

The above and other objects which may appear as the specification proceeds are achieved by this invention which comprises the provision of compounds selected from the group consisting of compounds having the formula (I)
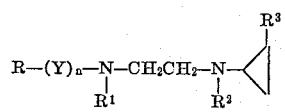

and the pharmaceutically acceptable nontoxic salts thereof. In Formula I, R is a member selected from the group consisting of (lower) alkynyl, thienyl, furyl, pyridyl, pyrrolyl, naphthyl and Ph-, wherein Ph is a radical of the formula (II)
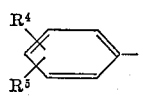

wherein $R^4$ and $R^5$ are each a member selected from the group consisting of hydrogen, chloro, bromo, iodo, fluoro, trifluoromethyl, (lower)alkyl, (lower)alkoxy, (lower)-alkylthio, di-(lower)alkylsulfamyl, phenyl, phenoxy, benzyl, and when taken together, methylenedioxy; $R^4$ and $R^5$ may be the same or different in each occurrence;

$n$ is a whole integer from 0 to 1 inclusive;

$R^1$ is a member selected from the group consisting of hydrogen, (lower)alkyl, (lower)alkenyl, (lower)alkynyl, and cycloalky radicas having from 3 to 7 carbon atoms, inclusive, e.g. cyclopropyl, cyclobutyl, cyclopentyl, cyclohexyl, and cycloheptyl;

$R^2$ is a member selected from the group consisting of hydrogen, (lower)alkyl, (lower)alkenyl, (lower)alkynyl, phenylalkyl, wherein the alkyl moiety contains from 1 to 4 carbon atoms, inclusive, and phenylalkenyl, wherein the alkenyl moiety contains from 2 to 4 carbon atoms, inclusive;

$R^3$ is a member selected from the group consisting of hydrogen, (lower)alkyl, (lower)alkenyl, (lower)alkynyl, Ph-, Ph-alk-, and Ph-alken-, in which Ph is as represented above, alk represents a divalent alkylene radical containing from 1 to 4 carbon atoms, inclusive, and Y is a member selected from the group consisting of (lower)alkylene, (lower)alkenylene, (lower)alkynylene, oxy(lower)alkylene and mercapto(lower)alkylene.

DETAILED DESCRIPTION

The pharmaceutically acceptable nontoxic salts include the organic and inorganic mono- and di- acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric, and the like.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g. ethenyl, allyl, 1-propenyl, 1-butenyl, 3-butenyl, 2-methyl-1-propenyl, 3-pentyl, 1-hexenyl, 7-octenyl, etc.

The term "(lower)alkenyl" as used herein means both straight and branched chain alkynyl radicals containing from 2 to 8 carbon atoms, e.g. ethinyl, propargyl, 1-butinyl, 2-butinyl, 1-1-dimethylpropargyl, 1-pentinyl, 1-heptinyl, etc.

The term "(lower)alkylene" as used herein means both straight and branched chain alkylene radicals containing from 1 to 8 carbon atoms, e.g. methylene, ethylene, octylene, propylene, butylene, isobutylene, t-butylene, amylene, hexylene, 2-ethyl-hexylene, etc.

The term "(lower)alkenylene" as used herein means both straight and branched chain alkenylene radicals containing from 1 to 8 carbon atoms, e.g. ethenylene, 1-propenylene, 3-butenylene, 2-methyl-1-1-butenylene, etc.

The term "(lower)alkynylene" as used herein means both straight and branched chain alkynylene radicals containing from 1 to 8 carbon atoms, e.g. ethinylene, propargylene, 1-propinylene, 3-butinylene, 1,1-dimethyl-3-butinylene, hexinylene, octinylene, etc.

Similarly, where the term "(lower)" is used as part of the description of another group, e.g., (lower)alkoxy, it refers to the alkyl portion of such group which is therefore as described in connection with "(lower)alkyl".

Preferred compounds of the present invention are those having the following formulae (III) 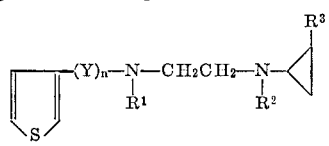

(IV) 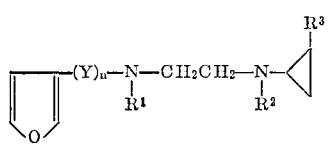

(V) 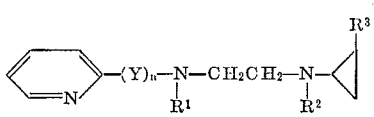

(VI) 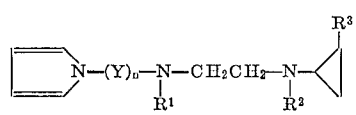

(VII) 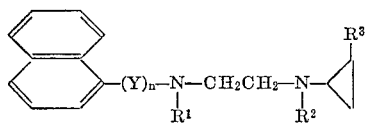

(VIII) 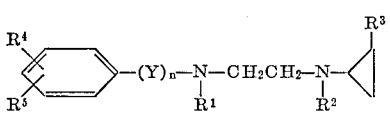

(IX) 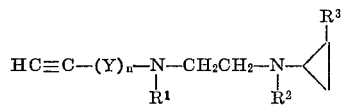

wherein $n$, $R^1$, $R^2$, $R^3$, $R^4$, $R^5$ and Y are as represented above.

Still more preferred compounds of the present invention are those having the following formulae (X) 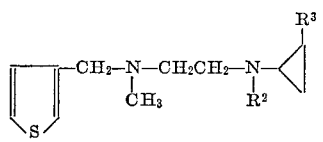

(XI) 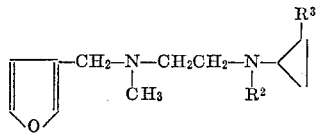

(XII) 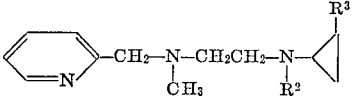

(XIII) 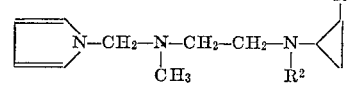

(XIV) 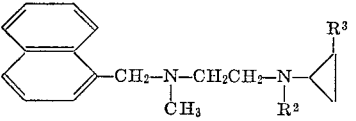

(XV) 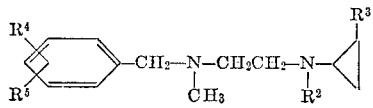

(XVI) 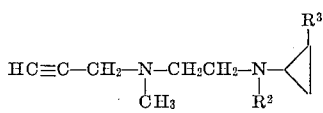

wherein $R^2$, $R^3$, $R^4$ and $R^5$ are as represented above.

Preferred individual compounds of this invention are those having the formulae (XVII) 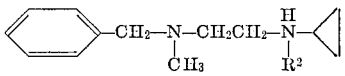

(XVIII) 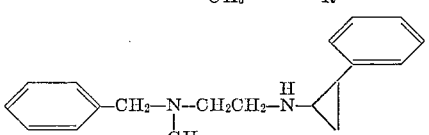

(XIX) 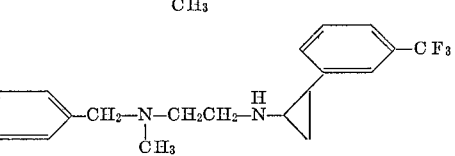

(XX) 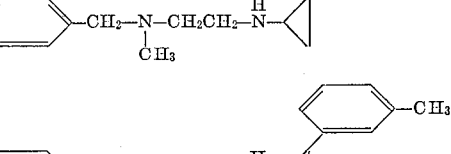

(XXI) 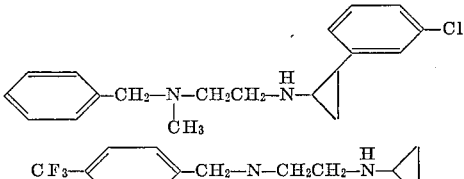

(XXII) 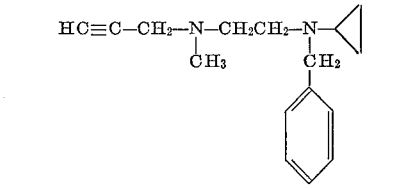

(XXIII) 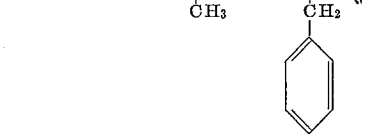

The compounds of this invention are valuable pharmaceutical agents. They produce marked increase in central nervous system activity which makes the compounds useful as antidepressant agents. In addition, the compounds inhibit the enzyme monoamine oxidase which makes the compounds useful as monoamine oxidase inhibitors.

It is generally accepted that elevation of certain brain amines results in psychic effects clinically. These effects take the form of mood elevation or antidepressant action. Brain norepinephrine and serotonin are brain amines chiefly metabolized by the enzyme monoamine oxidase. Inhibitors of this enzyme produce a characteristic elevation of these brain amines; and the ability of a compound to increase the level of brain norepinephrine and serotonin is well correlated with central monoamine oxidase inhibition.

The effect of the compounds of this invention on brain norepinephrine and serotonin was determined in mice by the method of Shore et al. (J. Pharmacol. 112, 295–300, 1958), as modified by Mead et al. (Bioch. Pharmacol. 6, 52–53, 1961), for the simultaneous extraction of both norepinephrine and serotonin from the same homogenate. The method involves extraction of norepinephrine and serotonin into butanol, return of the amines to an aqueous phase and conversion to a fluorescent derivative. Norepinephrine was determined by oxidation at pH 5, to trihydroxyindole, and serotonin by its native fluorescence in 3 N hydrochloric acid. The brains of eight mice were pooled for each determination, and the compound was administered orally. The level of brain amines was determined at different intervals after administration, and a control group was run in each experiment.

The results for a preferred compound of the present invention, N-benzyl-N-methyl-N'-cyclopropylethylenediamine, are summarized in the following table and show that the compound is a potent elevator of brain amines, and is, therefore, a powerful antidepressant agent.

| | Time after drug, hours | Percent increase in concentration over control | |
|---|---|---|---|
| | | Norepinephrine | Serotonin |
| Dose, mg./kg.: | | | |
| 18.75 | 3 | 58 | 46 |
| 30.00 | 3 | 33 | 50 |
| 30.00 | 16 | 20 | 60 |
| 30.00 | 30 | 42 | 66 |
| 37.50 | 3 | 50 | 60 |
| 75.00 | 3 | 56 | 93 |
| 75.00 | 16 | 42 | 48 |
| 75.00 | 30 | 32 | 36 |
| 150.00 | 3 | 40 | 90 |

The results for another preferred compound of the present invention, N-methyl-N-propargyl-N'-cyclopropyl-N'-benzylethylenediamine dihydrochloride, are summarized in the following table and show that the compound is a potent elevator of brain amines, and is, therefore, a powerful antidepressant agent.

| | Time of measurement post treatment | Brain amine level, percent increase over control | |
|---|---|---|---|
| | | Serotonin | Norepinephrine |
| Dose, mg./kg.: | | | |
| 9.37 | 3 hours | 68 | 68 |
| 10 | do | 57 | 35 |
| 10 | 16 hours | 58 | 49 |
| 10 | 24 hours | 62 | 28 |
| 10 | 48 hours | 41 | 29 |
| 10 | 72 hours | 44 | 28 |
| 10 | 96 hours | 32 | 18 |
| 10 | 120 hours | 47 | 32 |
| 10 | 7 days | 30 | 18 |
| 10 | 11 days | 10 | 0 |
| 18.75 | 3 hours | 45 | 38 |
| 18.75 | 16 hours | 57 | 44 |
| 37.50 | 3 hours | 113 | 89 |

The compounds of this invention are also capable of preventing the sedative effects of reserpine in mice. Oral administration of as little as 10 mg./kg. of a preferred compound of the present invention, N-benzyl-N-methyl-N' - cyclopropylethylenediamine, in mice three hours before intravenous administration of 5 mg./kg. of reserpine completely prevented symptoms usually associated with reserpine administration, i.e. increased motor activity, profuse salivation, and ptosis. Thus, the preferred compound of the present invention is a powerful monoamine oxidase inhibitor, and exhibits marked antidepressant activity. N-benzyl - N - methyl - N' - cyclopropylethylenediamine exhibited an oral $LD_{50}$ in mice of 849 mg./kg.

Another preferred compound, N-methyl-N-propargyl-N' - benzyl - N' - cyclopropylethylenediamine dihydrochloride, had a minimum effective dose of 10 mg./kg. and an oral $LD_{50}$ in mice of 420 mg./kg.

The compounds of the present invention are prepared by the acylation of a primary or a secondary cyclopropylamine of the formula (XXIV)

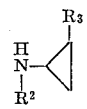

wherein $R^2$ and $R^3$ are as represented above with an α-haloacetylhalide or an α-tosylacetylhalide of the formula (XXV)

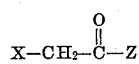

wherein X is chloro, bromo, iodo, fluoro, or tosyl, and Z is chloro, bromo, iodo, or fluoro, in the presence of an acid acceptor such as potassium carbonate, pyridine, triethylamine or sodium hydroxide in an aqueous acetone or benzene solution to yield an N'-cyclopropyl α-halo- or tosylacetamide of the formula (XXVI)

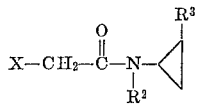

wherein X, $R^2$ and $R^3$ are as represented above. This procedure is generally described in U.S. Pat. No. 2,569,288.

Representative of the primary cyclopropylamines which may be used in this process are, cyclopropylamine,
β-methylcyclopropylamine,
β-ethylcyclopropylamine,
β-allylcyclopropylamine,
β-propargylcyclopropylamine,
β-phenylcyclopropylamine,
β-para-trifluoromethylphenylcyclopropylamine,
β-para-chlorophenylcyclopropylamine,
β-para-ethoxyphenylcyclopropylamine,
β-3,4-methylenedioxyphenylcyclopropylamine, and
β-para-methylthiophenylcyclopropylamine.

Representative of the secondary cyclopropylamines which may be employed are,

N-cyclopropyl-N-methylamine,
N-cyclopropyl-N-isopropylamine,
N-cyclopropyl-N-allylamine,
N-cyclopropyl-N-propargylamine,
N-cyclopropyl-N-benzylamine,
N-cyclopropyl-N-phenylisopropylamine,
N-cyclopropyl-N-cinnamylamine,
N-β-phenylcyclopropyl-N-methylamine,
N-β-(m-trifluoromethyl)phenylcyclopropyl-N-methylamine,
N-β-(p-fluoro)phenylcyclopropyl-N-allylamine,
N-β-(m,p-methylenedioxy)phenylcyclopropyl-N-propargylamine, and
N-β-(o-methylmercapto)phenylcyclopropyl-N-benzylamine.

Some of the α-halo- or tosylacetamide halides which may be used in this process are, α-chloroacetyl chloride,
α-bromoacetyl chloride,
α-iodoacetyl bromide and
α-para-tosylacetyl chloride.

Some of the N'-cyclopropyl α-halo- or tosylacetamides thus formed are,

N-cyclopropyl α-chloroacetamide,
N-2-methylcyclopropyl α-bromoacetamide,
N-2-phenylcyclopropyl α-iodoacetamide,
N-2-allylcyclopropyl α-chloroacetamide,
N-2-propargylcyclopropyl α-tosylacetamide,
N-2-(m-trifluoromethyl)phenylcyclopropyl α-chloroacetamide,
N-2-(p-fluoro)phenylcyclopropyl α-bromoacetamide,
N-2-(o-bromo)phenylcyclopropyl α-chloroacetamide,
N-2-(p-ethoxy)phenylcyclopropyl α-bromoacetamide,
N-2-(m,p-methylenedioxy)phenylcyclopropyl α-chloroacetamide,
N-2-(o-methylmercapto)phenylcyclopropyl α-chloroacetamide,
N-cyclopropyl-N-methyl α-bromoacetamide,
N-cyclopropyl-N-isopropyl α-bromoacetamide,
N-cyclopropyl-N-benzyl α-bromoacetamide,
N-2-methylcyclopropyl-N-allyl α-bromoacetamide,
N-2-phenylcyclopropyl-N-propargyl α-iodoacetamide,
N-2-(m-trifluoromethyl)phenylcyclopropyl-N-propargyl α-iodoacetamide,
N-2-allylcyclopropyl-N-methyl α-bromoacetamide, N-2-(p-fluoro)phenylcyclopropyl-N-benzyl α-bromoacetamide,
N-cyclopropyl-N-propargyl α-bromoacetamide,
N-2-phenylcyclopropyl-N-methyl α-bromoacetamide,
N-2-(o-chloro)phenylcyclopropyl-N-methyl α-bromoacetamide and
N-2-(o-methyl)phenylcyclopropyl-N-propargyl α-bromoacetamide.

The N'-cyclopropyl α-halo- or tosylacetamides are converted to N'-cyclopropylglycinamides of the formula (XXVII)

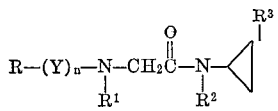

wherein R, R¹, R², R³, n and Y are as represented above, by reacting the acetamide with a primary or secondary amine in the presence of an acid acceptor such as triethylamine, potassium carbonate, aminopyrine, N-ethylaniline and an inert solvent such as benzene, toluene, xylene, dimethylformamide, dioxane, at elevated temperatures, e.g., reflux temperature. Isolation of the desired N'-cyclopropylglycinamide is then brought about by fractional distillation or crystallization. This step is generally described in U.S. Pat. No. 2,937,180.

Some of the primary amines which may be used in this step of the process are, aniline,
m-trifluoromethylaniline,
o-bromoaniline,
o-methylaniline,
p-proparglyoxyaniline,
p-ethoxyaniline,
m-methoxyaniline,
o-methylmercaptoaniline,
benzylamine,
α-methylbenzylamine,
α-isopropylbenzylamine,
o-chlorobenzylamine,
p-fluorobenzylamine,
m-trifluoromethylbenzylamine,
o-methylmercaptobenzylamine,
p-ethoxybenzylamine,
p-proparglyoxybenzylamine,
m,p-methylenedioxybenzylamine,
p-phenoxybenzylamine,
p-phenylbenzylamine,
p-dialkylsulfamylbenzylamine,
α-napthylamine,
β-naphthylamine,
α-naphthylmethylamine,
β-napthylmethylamine,
phenylisopropylamine,
p-fluorophenylisopropylamine,
m-trifluoromethylphenylisopropylamine,
p-ethoxyphenylisopropylamine,
o-methylmercaptophenylisopropylamine,
o-methylphenylisopropylamine,
α-thienylmethylamine,
β-thienylmethylamine,
2-furfurylmethylamine,
2-pyridylmethylamine,
3-pyridylmethylamine,
4-pyridymethylamine,
2-pyridylethylamine,
3-pyridylethylamine,
4-pyridylethylamine,
1-pyrrolylmethylamine,
propargylamine,
ethinylamine, and
butinyl.

Some of the secondary amines which may be used in this step of the process are,

N-phenyl-N-methylamine,
N-phenyl-N-propargylamine,
N-phenyl-N-allylamine,
N-phenyl-N-cyclopropylamine,
N-phenyl-N-cyclobutylamine,
N-phenyl-N-cyclopentylamine,
N-benzyl-N-methylamine,
N-benzyl-N-allylamine,
N-benzyl-N-propargylamine,
N-benzyl-N-cyclopropylamine,
N-benzyl-N-cyclobutylamine,
N-benzyl-N-cyclopentylamine,
N-benzyl-N-cycloheptylamine,
N-benzyl-N-cyclooctylamine,
N-p-ethoxyphenyl-N-methylamine,
N-p-chlorophenyl-N-methylamine,
N-o-bromophenyl-N-methylamine,
N-m-trifluoromethylphenyl-N-methylamine,
N-3,4-methylenedioxyphenyl-N-methylamine,
N-o-methylmercaptophenyl-N-methylamine,
N-p-dialkylsulfamylphenyl-N-methylamine,
N-o-methylphenyl-N-methylamine,
N-o-methylbenzyl-N-methylamine,
N-o-bromobenzyl-N-methylamine,
N-p-fluorobenzyl-N-methylamine,
N-m-trifluromethylbenzyl-N-methylamine,
N-p-ethoxybenzyl-N-methylamine,
N-p-proparglyoxybenzyl-N-methylamine,
N-p-phenoxybenzyl-N-methylamine,
N-p-phenylbenzyl-N-methylamine,
N-3,4-methylenedioxybenzyl-N-methylamine,
N-o-methylmercaptobenzyl-N-methylamine,
N-p-dialkylsulfamylbenzyl-N-methylamine,
N-o-methylbenzyl-N-propargylamine,
N-o-bromobenzyl-N-propargylamine,
N-p-fluorobenzyl-N-propargylamine,
N-m-trifluoromethylbenzyl-N-propargylamine,
N-p-ethoxybenzyl-N-propargylamine,
N-p-propargyloxybenzyl-N-propargylamine,
N-p-phenoxybenzyl-N-propargylamine,
N-p-phenylbenzyl-N-propargylamine,
N-3,4-methylenedioxybenzyl-N-propargylamine,
N-o-methylmercaptobenzyl-N-propargylamine,
N-p-dialkylsulfamylbenzyl-N-propargylamine,
N-methyl-N-propargylamine,
N-ethyl-N-propargylamine,
N-isopropyl-N-propargylamine,
N-allyl-N-propargylamine,
N-butenyl-N-propargylamine,
N-propargyl-N-propargylamine,
N-cyclopropyl-N-propargylamine,
N-methyl-N-ethinylamine, and
N-methyl-N-butinylamine.

Conversion of the N'-cyclopropylglycinamides to the ethylenediamines of this invention having the formula (XXVIII)

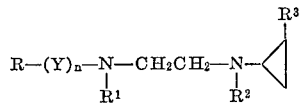

wherein R, R¹, R², R³, n and Y are as represented above, is accomplished by the reduction of the appropriate glycinamide, for example, with lithium aluminum hydride. This reduction is preferably carried out in a solvent such as ethyl ether, tetrahydrofuran, 1,2-dimethoxyethane or a polyglycol ether such as diglyme. Sodium borohydride may be employed in the presence of aluminum chloride using diethyleneglycol dimethyl ether as a solvent for the reduction.

Representative of the cyclopropylethylenediamines of this invention which may be produced in the foregoing manner are, N-phenyl-N'-cyclopropylethylenediamine,
N-phenyl-N-methyl-N'-cyclopropylethylenediamine,
N-phenyl-N-propargyl-N'-cyclopropylethlenediamine, N-phenyl-N-benzyl-N'-cyclopropylethylenediamine,
N-(m-trifluoromethylphenyl)-N-cyclopropyl-N'-cyclopropyl-N'-methylethylenediamine,
N-(p-chlorophenyl)-N-propargyl-N'-(2-phenylcyclopropyl)-N'-propargylethylenediamine,
N-(p-ethoxyphenyl)-N-cinnamyl-N'-(2-methylcyclopropyl)-N'-β-phenethylethylenediamine,
N-benzyl-N'-cyclopropylethylenediamine,
N-benzyl-N-methyl-N'-cyclopropylethylenediamine,
N-benzyl-N-allyl-N'-cyclopropylethylenediamine,
N-benzyl-N-propargyl-N'-cyclopropylethylenediamine,
N-benzyl-N-cyclopropyl-N'-cyclopropylethylenediamine,
N-benzyl-N-cyclopropylmethyl-N'-cyclopropylethylenediamine,
N-o-chlorobenzyl-N-methyl-N'-cyclopropylethylenediamine,
N-m-trifluoromethyl-N-methyl-N'-cyclopropyl-N'-propargylethylenediamine,
N-p-ethoxybenzyl-N-methyl-N'-cyclopropyl-N'-methylethylenediamine,
N-o-methylmercaptobenzyl-N-methyl-N'-cyclopropyl-N'-propargylethylenediamine,
N-p-phenoxybenzyl-N-methyl-N'-cyclopropyl-N'-β-phenethylethylenediamine,
N-p-phenylbenzyl-N-allyl-N'-2-methylcyclopropyl-N'-cinnamylethylenediamine,
N-benzyl-N-methyl-N'-2-phenylcyclopropylethylenediamine,
N-benzyl-N-methyl-N'-2-(m-trifluoromethylphenyl)cyclopropylethylenediamine,
N-benzyl-N-methyl-N'-2-(o-chlorophenyl)cyclopropylethylenediamine,
N-benzyl-N-methyl-N'-2-phenylcyclopropyl-N'-methylethylenediamine,
N-benzyl-N-methyl-N'-2-phenylcyclopropyl-N'-propargylethylenediamine,
N-benzyl-N-methyl-N'-cyclopropyl-N'-cinnamylethylenediamine,
N-benzyl-N-methyl-N',N'-biscyclopropylethylenediamine,
N-(4-diethylsulfamylbenzyl)-N-methyl-N'-cyclopropylethylenediamine,
N-cinnamyl-N-methyl-N'-cyclopropylethylenediamine,
N-α-methylphenethyl-N-methyl-N'-cyclopropylethylenediamine,
N-α-methyl-β-phenoxyethyl-N-methyl-N'-cyclopropylethylenediamine,
N-methyl-N-propargyl-N'-benzyl-N'-cyclopropylethylenediamine,
N-methyl-N-propargyl-N'-benzyl-N'-β-methylcyclopropylethylenediamine,
N-methyl-N-propargyl-N'-benzyl-N'-β-allylcyclopropylethylenediamine,
N-methyl-N-propargyl-N'-benzyl-N'-β-phenylcyclopropylethylenediamine,
N-methyl - N - propargyl-N'-phenyl-N'-cyclopropylethylenediamine,
N-ethyl-N-propargyl-N'-benzyl-N'-cyclopropylethylenediamine,
N-isopropyl-N-propargyl-N'-benzyl-N'-cyclopropylethylenediamine,
N-allyl-N-propargyl-N'-benzyl-N'-cyclopropylethylenediamine,
N-butenyl-N-propargyl-N'-benzyl-N'-cyclopropylethylenediamine,
N-propargyl-N-propargyl-N'-benzyl-N'-cyclopropylethylenediamine,
N-cyclopropyl-N-propargyl-N'-benzyl-N'-cyclopropylethylenediamine,
N-methyl-N-butinyl-N'-benzyl-N'-cyclopropylethylenediamine,
N-methyl-N-ethinyl-N'-benzyl-N'-cyclopropylethylenediamine,
N-propargyl-N'-cyclopropylethylenediamine,
N-propargyl-N'-benzyl - N'-cyclopropylethylenediamine, and
N-methyl-N-propargyl - N'-cyclopropylethylenediamine.

The tertiary cyclopropylethylenediamines of Formula XXVIII but wherein $R^2$ is other than hydrogen, may also be produced by reacting a secondary diamine such as N-benzyl - N - methyl - N'cyclopropylethylenediamine with a reactive alkyl, alkenyl, alkynyl, aralkyl, aralkenyl or aralkynyl halide in the presence of an acid acceptor such as triethylamine, potassium carbonate and an inert solvent such as benzene or toluene; and then methylating the secondary amine with formaldehyde and formic acid.

The tertiary ethylenediamines of this invention may also be produced by reacting a secondary diamine such as N-methyl - N'-benzyl-N' - cyclopropylethylenediamine with a Grignard reagent such as methylmagnesium bromide and allowing the resulting magnesium amide salt to interact with a reactive halide such as propargyl bromide. This method may be carried out according to the following reaction scheme:

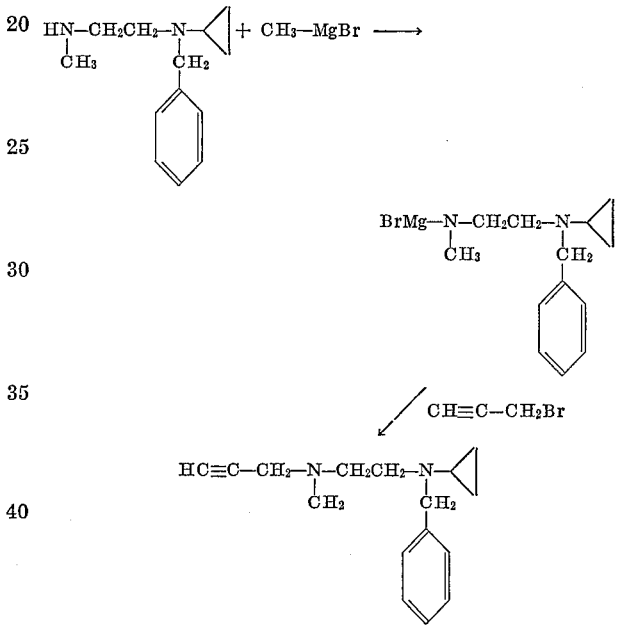

An alternate process of forming the diamines of Formula I consists of forming an α-haloacetamide of the formula (XXIX)

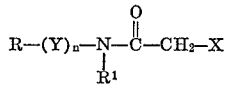

wherein R, Y, $n$, $R^1$ and X are as represented above according to the general procedure described above for preparing the N'-cyclopropyl α-haloacetamides of Formula XXVI and then allowing the α-halo group to react with a primary or secondary cyclopropylamine of Formula XXIV to yield an N'-cyclopropylglycinamide of the formula (XXX)

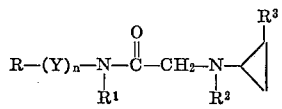

wherein R, Y, $n$, $R^1$, $R^2$ and $R^3$ are as represented above.

The glycinamide of Formula XXX may then be reduced with lithium aluminum hydride or sodium borohydride to the desired ethylenediamine of Formula I.

The starting materials used in the processes described herein are compounds which are either commercially available, well-known in the art, or easily prepared in accordance with satndard organic procedures previously described in the chemical literature.

For example, the preparation of various cyclopropylamines is described in J. Med. Pharm. Chem. 5(6), 1243–1265 (1962), U.S. Pats. Nos. 3,079,403, 3,081,336 and 3,083,226; British Pat. No. 913,898; and Canadian Pat. No. 685,776, etc.; and the preparation of various propargylamines is described in J. Med. Chem. 7, 390 (1964).

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositons of this invention when administered orally or parenterally, in an effective amount, are effective in the treatment of depression and for monoamine oxidase inhibition. The usual dosage is from 10 to 200 mgm./kg., although lesser or greater quantities may be used.

The following examples are intended to illustrate the invention described herein without unduly restricting it.

EXAMPLE 1

Preparation of N'-cyclopropyl α-chloroacetamide

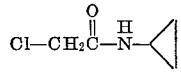

Cyclopropylamine (70 gm., 1.23 mol) was added to 150 ml. water and cooled in an ice-water bath. To the stirred mixture was added dropwise and simultaneously 113 gm. (1.23 mol) α-chloroacetyl chloride and an aqueous solution containing 50 gm. of sodium hydroxide. The amide separated as a white solid and was collected by filtration. The solid was taken up in methylene chloride and dried with $Na_2SO_4$. Removal of the solvent yielded 131 gm. of N'-cyclopropyl α-chloroacetamide having a melting point of 81–84° C., and an infrared absorption spectrum as follows:

$$\lambda_{max.}^{CHCl_3} \ 2.96, \ 6.03, \ 6.65\mu$$

EXAMPLE 2

Preparation of N'-benzyl-N'-cyclopropyl α-chloroacetamide

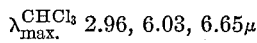

A mixture of 29 gm. (0.2 mol) of N'-benzyl-N'-cyclopropylamine and 65 ml. of water was cooled in an ice bath with good stirring, α-chloroacetyl chloride (34 gm., 0.3 mol), and 8 gm. (0.2 mol) of NaOH in an equal volume of water were added simultaneously and dropwise to the cold amine solution. When the addition was completed, stirring was continued for another 30 minutes and the solution was extracted with ether. The ethereal solution was washed twice with 10% NaOH, then water, dried with $MgSO_4$, an filtered. Removal of the ether in vacuo yielded a residue which was fractionally distilled. Yield 25 gm., B.P. 128–130°/0.15 mm. Hg.

$$\lambda_{max.}^{film} \ 3.08 \text{ and } 6.08$$

EXAMPLE 3

Preparation of N'-2-phenylcyclopropyl α-chloroacetamide

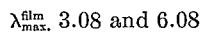

2-phenylcyclopropylamine (1.23 mol) was added to 150 ml. water and cooled in an ice-water bath. To the stirred mixture was added dropwise and simultaneously 113 gm. (1.23 mol) α-chloroacetyl chloride and an aqueous solution containing 50 gm. of sodium hydroxide. The amide separated as a white solid and was collected by filtration. The solid was taken up in methylene chloride and dried with $Na_2SO_4$. Removal of the solvent yielded N'-2-phenylcyclopropyl α-chloroacetamide.

EXAMPLE 4

When, in the procedure of Example 1, the cyclopropylamine is replaced by an equal molar amount of 2-methylcyclopropylamine,
2-ethylcyclopropylamine,
2-isopropylcyclopropylamine,
2-phenylcyclopropylamine,
2-benzylcyclopropylamine,
2-4-chlorophenylcyclophopylamine,
2-4-trifluoromethylphenylcyclopropylamine,
2-4-methylphenylcyclopropylamine,
2-2-fluorophenylcyclopropylamine,
2-3-methylphenylcyclopropylamine,
2-3-bromophenylcyclopropylamine,
2-2,6-dichlorophenylcyclopropylamine,
2-4-methylthiophenylcyclopropylamine,
2-2-dimethylsulfamylphenylcyclopropylamine,
2-2-iodo-4-methylphenylcyclopropylamine,
2-4-isopropylphenylcyclopropylamine,
2-4-phenylphenylcyclopropylamine,
2-3-phenoxyphenylcyclopropylamine,
2-4-benzylphenylcyclopropylamine,
2-3,4-methylenedioxyphenylcyclopropylamine,
2-4-fluorophenylcyclopropylamine,
2-4-chlorobenzylphenylcyclopropylamine,
2-phenethylcyclopropylamine,
2-allylcyclopropylamine,
2-propargylcyclopropylamine,
2-1-butinylcyclopropylamine,
2-ethinylcyclopropylamine,
2-ethenylcyclopropylamine,
2-1-propenylcyclopropylamine,
2-3-butenylcyclopropylamine,
2-1-hexenylcyclopropylamine,
2-phenylisopropylcyclopropylamine,
2-4-phenoxyphenylcyclopropylamine,
2-cinnamylcyclopropylamine,
2-2,4-dimethylphenylcyclopropylamine, and
2-4-trifluoromethylcinnamylcyclopropylamine, there are obtained, N'-2-methylcyclopropyl α-chloroacetamide,
N'-2-ethylcyclopropyl α-chloroacetamide,
N'-2-isopropylcyclopropyl α-chloroacetamide,
N'-2-phenylcyclopropyl α-chloroacetamide,
N'-2-benzylcyclopropyl α-chloroacetamide,
N'-2-4-chlorophenylcyclopropyl α-chloroacetamide,
N'-2-4-trifluoromethylphenylcyclopropyl α-chloroacetamide,
N'-2-4-methylphenylcyclopropyl α-chloroacetamide,
N'-2-2-fluorophenylcyclopropyl α-chloroacetamide,
N'-2-3-methylphenylcyclopropyl α-chloroacetamide,
N'-2-3-bromophenylcyclopropyl α-chloroacetamide,
N'-2-2,6-dichlorophenylcyclopropyl α-chloroacetamide,
N'-2-4-methylthiophenylcyclopropyl α-chloroacetamide,
N'-2-2-dimethylsulfamylphenylcyclopropyl α-chloroacetamide,
N'-2-2-iodo-4-methylphenylcyclopropyl α-choloracetamide,
N'-2-4-isopropylphenylcyclopropyl α-choloracetamide,
N'-2-4-phenylphenylcyclopropyl α-chloroacetamide,
N'-2-3-phenoxyphenylcyclopropyl α-chloroacetamide,
N'-2-4-benzylphenylcyclopropyl α-chloroacetamide,
N'-2-3,4-methylenedioxyphenylcyclopropyl α-chloroacetamide,
N'-2-4-fluorophenylcyclopropyl α-chloroacetamide, N'-2-4-chlorobenzylphenylcyclopropyl α-chloroacetamide,
N'-2-phenethylcyclopropyl α-chloroacetamide,
N'-2-allylcyclopropyl α-chloroacetamide,
N'-2-propargylcyclopropyl α-chloroacetamide,
N'-2-1-butinylcyclopropyl α-chloroacetamide,
N'-2-ethinylcyclopropyl α-chloroacetamide,
N'-2-ethenylcyclopropyl α-chloroacetamide,
N'-2-1-propenylcyclopropyl α-chloroacetamide,
N'-2-3-butenylcyclopropyl α-chloroacetamide,
N'-2-1-hexenylcyclopropyl α-chloroacetamide,
N'-2-phenylisopropylcyclopropyl α-chloroacetamide,
N'-2-4-phenoxyphenylcyclopropyl α-chloroacetamide,
N'-2-cinnamylcyclopropyl α-chloroacetamide,
N'-2-2,4-dimethylphenylcyclopropyl α-chloroacetamide, and
N'-2-4-trifluoromethylcinnamylcyclopropyl α-chloroacetamide, respectively.

EXAMPLE 5

When, in the procedure of Example 2, N'-benzyl-N'-cyclopropylamine, is replaced by an equal molar amount of N'-methyl-N'-cyclopropylamine,
N'-isopropyl-N'-cyclopropylamine,
N'-allyl-N'-cyclopropylamine,
N'-propargyl-N'-cyclopropylamine,
N'-phenethyl-N'-cyclopropylamine,
N'-butyl-N'-cyclopropylamine,
N'-ethinyl-N'-cyclopropylamine,
N'-cinnamyl-N'-cyclopropylamine,
N'-1-butinyl-N'-cyclopropylamine,
N'-1-propenyl-N'-cyclopropylamine,
N'-methyl-N'-2-phenylcyclopropylamine,
N'-methyl-N'-2-(3-trifluoromethyl)phenylcyclopropylamine,
N'-allyl-N'-2-(4-fluoro)phenylcyclopropylamine,
N'-propargyl-N'-2-(3,4-methylenedioxy)phenylcyclopropylamine,
N'-benzyl-N'-2-(2-methylthio)phenylcyclopropylamine,
N'-methyl-N'-2-benzylcyclopropylamine,
N'-methyl-N'-2-(4-trifluoromethyl)phenylcyclopropylamine,
N'-benzyl-N'-2-benzylcyclopropylamine,
N'-methyl-N'-2-2,6-dichlorophenylcyclopropylamine, and
N'-methyl-N'-2-2-methyl-4-trifluoromethylphenylcyclopropylamine, there are obtained, N'-methyl-N'-cyclopropyl-α-chloroacetamide,
N'-isopropyl-N'-cyclopropyl α-chloroacetamide,
N'-allyl-N'-cyclopropyl α-chloroacetamide,
N'-propargyl-N'-cyclopropyl α-chloroacetamide,
N'-phenethyl-N'-cyclopropyl α-chloroacetamide,
N'-butyl-N'-cyclopropyl α-chloroacetamide,
N'-ethinyl-N'-cyclopropyl α-chloroacetamide,
N'-cinnamyl-N'-cyclopropyl α-chloroacetamide,
N'-1-butinyl-N'-cyclopropyl α-chloroacetamide,
N'-1-propenyl-N'-cyclopropyl α-chloroacetamide,
N'-methyl-N'-2-phenylcyclopropyl α-chloroacetamide,
N'-methyl-N'-2-3-trifluoromethylphenylcyclopropyl α-chloroacetamide,
N'-allyl-N'-2-4-fluorophenylcyclopropyl α-chloroacetamide,
N'-propargyl-N'-2-3,4-methylenedioxyphenylcyclopropyl α-chloroacetamide,
N'-benzyl-N'-2-2-methylthiophenylcyclopropyl α-chloroacetamide,
N'-methyl-N'-2-benzylcyclopropyl α-chloroacetamide,
N'-methyl-N'-2-4-trifluoromethylphenylcyclopropyl α-chloroacetamide,
N'-benzyl-N'-2-benzylcyclopropyl α-chloroacetamide,
N'-methyl-N'-2-2,6-dichlorophenylcyclopropyl α-chloroacetamide, and
N'-methyl-N'-2-2-methyl-4-trifluoromethylphenylcyclopropyl α-chloroacetamide respectively.

EXAMPLE 6

Preparation of α-(N-benzyl-N-methyl)-amino-N'-cyclopropylacetamide

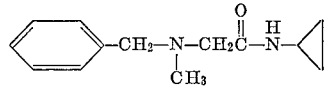

To a gently refluxing solution of α-chloro-N'-cyclopropylacetamide (131 gm., 0.97 mol) and triethylamine (110 gm.) in benzene (2 liters) was added dropwise N-methylbenzenylamine (130 gm., 1.0 mol). The solution was refluxed overnight, and upon cooling, the salts were removed by filtration. Benzene was removed in vacuo to leave a residue of 226 gm. of crude α-(N-benzyl-N-methyl)amino-N'-cyclopropylacetamide.

A portion of the crude product was purified by distillation, B.P. 135° C./0.2 mm. On standing, the α-(N-benzyl-N-methyl) - amino-N'-cyclopropylacetamide crystallized, and after washing with petroleum ether, showed a melting point of 49–52° C., and infrared absorption spectra as follows:

$$\lambda_{max.}^{film} \; 3.06, \; 6.02, \; 6.55, \; 13.50 \text{ and } 14.40\mu$$

$$\lambda_{max.}^{Nujol} \; 3.07, \; 6.03, \; 6.50, \; 13.50 \text{ and } 14.40\mu$$

EXAMPLE 7

Preparation of N-benzyl-N-methyl-N'-cyclopropylethylenediamine

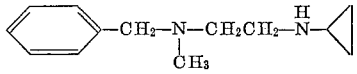

α-(N-benzyl - N - methyl)amino - N' - cyclopropylacetamide, prepared in Example 6, was dissolved in tetrahydrofuran (anhydrous) and added dropwise to a suspension of lithium aluminum hydride (43 gm.) in anhydrous tetrahydrofuran (1 liter). After completion of the addition, the mixture was refluxed with stirring for 3 hours to complete the reduction. The mixture was cooled in an ice bath and the excess lithium aluminum hydride was destroyed by the addition of a saturated aqueous sodium sulfate solution. Upon removal of the tetrahydrofuran in vacuo, an oil remained which was dissolved in ether, dried over anhydrous potassium carbonate and purified by fractional distillation, B.P. 70–72° C./0.10–0.15 mm., to yield 167 gm. of N-benzyl-N-methyl-N'-cyclopropylethylenediamine.

EXAMPLE 8

Preparation of N-benzyl-N-methyl-N'-cyclopropylethylenediamine dihydrochloride

N-benzyl - N - methyl-N'-cyclopropylethylenediamine, prepared in Example 7, was dissolved in ethanol, and converted to its dihydrochloride by the addition of an excess of ethanolic HCl.

157 gm. of N-benzyl-N-methyl-N'-cyclopropylethylenediamine dihydrochloride were obtained having a melting point of 230–231° C., and the following analysis:

Calc'd for $C_{13}H_{22}Cl_2N_2$ (percent): C, 56.36; H, 8.01; N, 10.11; Cl, 25.60. Found (percent): C, 56.44; H, 8.73; N, 9.80; Cl, 25.46.

EXAMPLE 9

Preparation of N-benzyl-N-methyl-N'-cyclopropyl-N'-formylethylenediamine

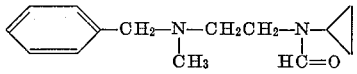

To a chloroform solution containing N-benzyl-N-methyl-N'-cyclopropylethylenediamine (8.0 gm., 0.022 mol) prepared in Example 7, was added chloral (5.3 gm.).

The mixture was stirred at room temperature for 2 hours, and then refluxed for 1 hour. The chloroform was removed by distillation, and 8.9 gm. of the product, N-benzyl - N - methyl-N'-cyclopropyl-N'-formylethylenediamine, was collected by fractional distillation, B.P. 126–130° C./0.2 mm., had an infrared absorption spectrum as follows:

$\lambda_{max.}^{film}$ 6.00, 13.60 and 14.40$\mu$

EXAMPLE 10

Preparation of N-benzyl-N'-cyclopropyl-N,N'-dimethylethylenediamine

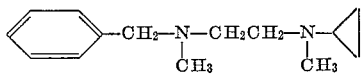

N-benzyl - N - methyl-N'-cyclopropyl-N'-formylethylenediamine, prepared in Example 9, was dissolved in tetrahydrofuran (anhydrous) and added dropwise to a suspension of lithium aluminum hydride (3.5 gm.) in anhydrous tetrahydrofuran (1 liter). After completion of the addition, the mixture was refluxed with stirring for 3 hours to complete the reduction. The mixture was colled in an ice bath and the excess lithium aluminum hydride was destroyed by the addition of a saturated aqueous sodium sulfate solution. Upon removal of the tetrahydrofuran in vacuo, 5.2 gm. of the product, N-benzyl - N' - cyclopropyl-N,N'-dimethylethylenediamine, was collected by distillation, B.P. 95–100° C./0.2 mm., having an infrared absorption spectrum as follows:

$\lambda_{max.}^{film}$ no band at 6.00, band at 13.65 and 14.40$\mu$

This indicates complete reduction of the formyl group.

EXAMPLE 11

Preparation of N-benzyl-N'-cyclopropyl-N,N'-dimethylethylenediamine dihydrochloride N-benzyl - N ' - cyclopropyl-N,N'-dimethylethylenediamine, prepared in Example 10, was converted to the dihydrochloride salt with gaseous HCl in ethanol, yielding 4.8 gm. of N-benzyl-N'-cyclopropyl - N,N' - dimethylethylenediamine dihydrochloride, which had a melting point of 117–119° C.

EXAMPLE 12

Preparation of N-bnezyl-N-methyl-N'-cyclopropyl-N'-propargylethylenediamine

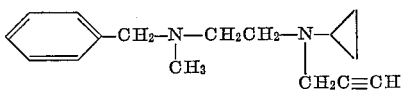

To a refluxing solution (under nitrogen) of N-benzyl-N-methyl-N'-cyclopropyl-1,2-diaminoethane (12.7 gm., 0.062 mol) in tetrahydrofuran (100 ml.) was added dropwise 32.6 ml. of 2 N CH₃MgBr solution. After evolution of methane ceased, 7.4 gm. (0.062 mol) of propargyl bromide in benzene (150 ml.) was added to the reaction mixture and refluxed for 3 hours. The solution was treated with water (100 ml.), the benzene layer was decanted, and the aqueous part was extracted twice with benzene. After drying, the benzene was removed and the residue distilled. Material with a B.P. of 95–100° C./0.15 mm., was collected, yielding 5.2 gm. of N - benzyl-N-methyl - N ' - cyclopropyl-N'-propargylethylenediamine which had an infrared spectrum as follows:

$\lambda_{max.}^{film}$ 3.05, 13.75 and 14.40$\mu$

EXAMPLE 13

Preparation of N-benzyl-N-methyl-N'-cyclopropyl-N'-propargylethylenediamine dihydrochloride N - benzyl - N - methyl-N'-cyclopropyl-N'-propargylethylenediamine, prepared in Example 12, was converted to the dihydrochloride salt with gaseous HCl in ethanol. Removal of ethanol yielded a gum which crystallized from a little ethanol after standing overnight at room temperature, and which had a melting point of 164.4–169.5° C. Recrystalization from ethanol-ether yielded 4.8 gm. of N - benzyl - N - methyl-N'-cyclopropyl-N'-propargylethylenediamine dihydrochloride, having a melting point of 165–166° C., and an infrared absorption spectrum as follows:

$\lambda_{max.}^{film}$ 3.05, 13.45, 14.35, 14.80 and 15.70$\mu$

EXAMPLE 14

Preparation of α-(N-benzyl-N-methyl)amino-N'-2-phenylcyclopropylacetamide

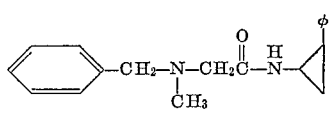

To a gently refluxing solution of 21.2 gm. (0.10 mol) of α - chloro-N'-2-phenylcyclopropylacetamide and 11.0 gm. triethylamine in 250 cc. of benzene was added dropwise 14.3 gm. (0.11 mol) of N-benzyl-N-methylamine and the solution refluxed for 20 hours. After removal of the salts and the benzene, the product, α-(N-benzyl-N-methyl)amino-N' - 2 - phenylcyclopropylacetamide, was subjected to reduction without further purification as shown in the subsequent example.

EXAMPLE 15

Preparation of N-benzyl-N-methyl-N'-2-phenylcyclopropylethylenediamine

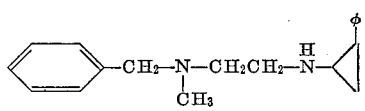

α(N-benzyl - N - methyl)amino-N'-2 - phenylcyclopropylacetamide, prepared in Example 14, was dissolved in tetrahydrofuran (anhydrous) and added dropwise to a suspension of lithium aluminum hydride (43 gm.) and anhydrous tetrahydrofuran (1 liter). After completion of the addition, the mixture was refluxed with stirring for 3 hours to complete the reduction. The mixture was cooled in an ice bath and the excess lithium aluminum hydride was destroyed by the addition of a saturated aqueous sodium sulfate solution. Upon removal of the tetrahydrofuran in vacuo, an oil remained which was dissolved in ether, dried over anhydrous potassium carbonate and purified by fractional distillation, B.P. 115–118° C./0.10 mm., to yield 15 gm., of N-benzyl-N-methyl-N'-2-phenylcyclopropylethylenediamine.

EXAMPLE 16

Preparation of α-(N-m-trifluoromethylbenzyl-N-methyl)-amino-N'-cyclopropylacetamide

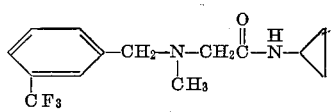

α-Chloro-N'-cyclopropylacetamide is reacted with N-m-trifluoromethylbenzyl-N-methylamine (obtained from the reaction of m-chloromethylbenzotrifluoride and excess methylamine) in the manner described in Example 6, to produce α-(N-m-trifluoromethylbenzyl - N - methyl)-amino-N'-cyclopropylacetamide.

EXAMPLE 17

Preparation of N-m-trifluoromethylbenzyl-N-methyl-N'-cyclopropylethylenediamine

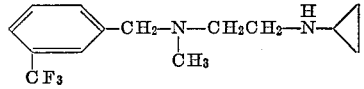

α-(N-m-trifluoromethylbenzyl - N - methyl)amino - N'-cyclopropylacetamide, prepared in Example 16, is reduced with lithium aluminum hydride in tetrahydrofuran according to the method of Example 7, to produce N-m-trifluoromethylbenzyl - N - methyl - N' - cyclopropylethylenediamine.

EXAMPLE 18

Preparation of α-(N-o-chlorobenzyl-N-methyl)-amino-N'-cyclopropylacetamide

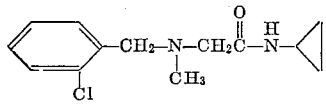

α-Chloro-N'-cyclopropylacetamide is reacted with N-o-chlorobenzyl-N-methylamine in the manner described in Example 6. The product, α-(N-o-chlorobenzyl-N-methyl)-amino-N'-cyclopropylacetamide, is reduced without further purification as shown in the subsequent example.

EXAMPLE 19

Preparation of N-o-chlorobenzyl-N-methyl-N'-cyclopropylethylenediamine

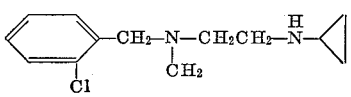

α - (N-o-chlorobenzyl-N-methyl)amino-N'-cyclopropylacetamide, prepared in Example 18, is reduced with lithium aluminum hydride in tetrahydrofuran according to the method of Example 7, to produce N-o-chlorobenzyl-N-methyl-N'-cyclopropylethylenediamine.

EXAMPLE 20

When, in the procedure of Example 6, α-chloro-N'-cyclopropylacetamide is replaced by an equal molar amount of N'-2-methylcyclopropyl α-chloroacetamide,
N'-2-ethylcyclopropyl α-chloroacetamide,
N'-2-isopropylcyclopropyl α-chloroacetamide,
N'-2-phenylcyclopropyl α-chloroacetamide,
N'-2-benzylcyclopropyl α-chloroacetamide,
N'-2-4-chlorophenylcyclopropyl α-chloroacetamide,
N'-2-4-trifluoromethylphenylcyclopropyl α-chloroacetamide,
N'-2-4-methylphenylcyclopropyl α-chloroacetamide,
N'-2-2-fluorophenylcyclopropyl α-chloroacetamide,
N'-2-3-methylphenylcyclopropyl α-chloroacetamide,
N'-2-3-bromophenylcyclopropyl α-chloroacetamide,
N'-2-2,6-dichlorophenylcyclopropyl α-chloroacetamide,
N'-2-4-methylthiophenylcyclopropyl α-chloroacetamide,
N'-2-2-dimethylsulfamylphenylcyclopropyl α-chloroacetamide,
N'-2-2-iodo-4-methylphenylcyclopropyl α-chloroacetamide,
N'-2-4-isopropylphenylcyclotropyl α-chloroacetamide,
N'-2-4-phenylphenylcyclopropyl α-chloroacetamide,
N'-2-3-phenoxyphenylcyclopropyl α-chloroacetamide,
N'-2-4-benzylphenylcyclopropyl α-chloroacetamide,
N'-2-3,4-methylenedioxyphenylcyclopropyl α-chloroacetamide,
N'-2-4-fluorophenylcyclopropyl α-chloroacetamide,
N'-2-4-chlorobenzylphenylcyclopropyl α-chloroacetamide,
N'-2-phenethylcyclopropyl α-chloroacetamide,
N'-2-allylcylclopropyl α-chloroacetamide,
N'-2-propargylcyclopropyl α-chloroacetamide,
N'-2-1-butinylcyclopropyl α-chloroacetamide,
N'-2-ethinylcyclopropyl α-chloroacetamide,
N'-2-ethenylcyclopropyl α-chloroacetamide,
N'-2-1-propenylcyclopropyl α-chloroacetamide,
N'-2-3-butenylcyclopropyl α-chloroacetamide,
N'-2-1-hexenylcyclopropyl α-chloroacetamide,
N'-2-phenylisopropylcyclopropyl α-chloroacetamide,
N'-2-4-phenoxyphenylcyclopropyl α-chloroacetamide,
N'-2-cinamylcyclopropyl α-chloracetamide,
N' - 2 - 2,4-dimethylphenylcyclopropyl α-chloroacetamide and
N'-2-4-trifluoromethylcinnamylcyclopropyl α-chloroacetamide, there are obtained, α-N-benzyl-N-methylamino-N'-2-methylcyclopropylacetamide,
α-N-benzyl-N-methylamino-N'-2-ethylcyclopropylacetamide,
α-N-benzyl-N-methylamino-N'-2-isopropylcyclopropylacetamide,
α-N-benzyl-N-methylamino-N'-2-phenylcyclopropylacetamide,
α-N-benzyl-N-methylamino-N'-2-benzylcyclopropylacetamide,
α-N-benzyl-N-methylamino-N'-2-4-chlorophenylcyclopropylacetamide,
α - N - benzyl-N-methylamino-N'-2-4-trifluoromethylphenylcyclopropylacetamide,
α-N-benzyl-N-methylamino-N'-2-4-methylphenylcyclopropylacetamide,
α-N-benzyl-N-methylamino-N'-2-2-fluorophenylcyclopropylacetamide,
α - N - benzyl-N-methylamino-N'-2-3-methylphenylcyclopropylacetamide,
α-N-benzyl-N-methylamino-N'-2-3-bromophenylcyclopropylacetamide,
α-N-benzyl-N-methylamino-N'-2-2,6-dichlorophenylcyclopropylacetamide,
α-N-benzyl-N-methylamino-N'-2-4-methylthiophenylcyclopropylacetamide,
α - N - benzyl - N-methylamino-N'-2-2-dimethylsulfamylphenylcyclopropylacetamide,
α - N-benzyl-N-methylamino-N'-2-2-iodo-4-methylphenylcyclopropylacetamide,
α-N-benzyl-N-methylamino-N'-2-4-isopropylphenylcyclopropylacetamide,
α-N-benzyl-N-methylamino-N'-2-4-phenylphenylcyclopropylacetamide,
α-N-benzyl-N-methylamino-N'-2-3-phenoxyphenylcyclopropylacetamide,
α-N-benzyl-N-methylamino-N'-2-4-benzylphenylcyclopropylacetamide,
α-N-benzyl-N-methylamino-N'-2-3,4-methylenedioxyphenylcyclopropylacetamide,
α-N-benzyl-N-methylamino-N'-2-4-fluorophenylcyclopropylacetamide,
α - N - benzyl-N-methylamino-N'-2-4-chlorobenzylphenylcyclopropylacetamide,
α-N-benzyl-N-methylamino-N'-2-phenethylcyclopropylacetamide,
α-N-benzyl-N-methylamino-N'-2-allylcyclopropylacetamide,
α-N-benzyl-N-methylamino-N'-2-propargylcyclopropylacetamide,
α - N - benzyl-N-methylamino-N'-2-1-butinylcyclopropylacetamide,
α-N-benzyl-N-methylamino-N'-2-ethinylcyclopropylacetamide,
α-N-benzyl-N-methylamino-N'-2-ethenylcyclopropylacetamide,
α-N-benzyl-N-methylamino-N'-2-1-propenylcyclopropylacetamide,
α - N - benzyl-N-methylamino-N'-2-3-butenylcyclopropylacetamide,
α - N - benzyl-N-methylamino-N'-2-1-hexenylcyclopropylacetamide,
α - N - benzyl-N-methylamino-N'-2-phenylisopropylcyclopropylacetamide,
α-N-benzyl-N-methylamino-N'-2-4-phenoxyphenylcyclopropylacetamide,
α-N-benzyl-N-methylamino-N'-2-cinamylcyclopropylacetamide, α-N-benzyl-N-methylamino-N'-2-2,4-dimethylphenyl-
cyclopropylacetamide, and
α - N - benzyl - N-methylamino-N'-2-4-trifluoromethylcin-
namylcyclopropylacetamide, respectively.

EXAMPLE 21

When, in the procedure of Example 7, α-(N-benzyl-N-methyl)amino-N'-cyclopropylacetamide is replaced by an equal molar amount of each of the products of Example 20, there are obtained, N-benzyl-N-methyl-N'-2-methylcyclopropylethyl-
enediamine,
N-benzyl-N-methyl-N'-2-ethylcyclopropylethylene-
diamine,
N-benzyl-N-methyl-N'-2-isopropylcyclopropylethyl-
enediamine,
N-benzyl-N-methyl-N'-2-phenylcyclopropylethylene-
diamine,
N-benzyl-N-methyl-N'-2-benzylcyclopropylethylene-
diamine,
N-benzyl-N-methyl-N'-2-4-chlorophenylcyclopropyl-
ethylenediamine,
N-benzyl-N-methyl-N'-2-4-trifluoromethylphenyl-
cyclopropylethylenediamine,
N-benzyl-N-methyl-N'-2-4-methylphenylcyclopropyl-
ethylenediamine,
N-benzyl-N-methyl-N'-2-2-fluorophenylcyclopropyl-
ethylenediamine,
N-benzyl-N-methyl-N'-2-3-methylphenylcyclopropyl-
ethylenediamine,
N-benzyl-N-methyl-N'-2-3-bromophenylcyclopropyl-
ethylenediamine,
N-benzyl-N-methyl-N'-2-2,6-dichlorophenylcyclo-
propylethylenediamine,
N-benzyl-N-methyl-N'-2-4-methylthiophenylcyclo-
propylethylenediamine,
N - benzyl-N-methyl-N'-2-2-dimethylsulfamylphenylcyclo-
propylethylenediamine,
N-benzyl-N-methyl-N'-2-2-iodo-4-methylphenyl-
cyclopropylethylenediamine,
N-benzyl-N-methyl-N'-2-4-isopropylphenylcyclo-
propylethylenediamine,
N-benzyl-N-methyl-N'-2-4-phenylphenylcyclopropyl-
ethylenediamine,
N - benzyl - N-methyl-N'-2-3-phenoxyphenylcyclopropyl-
ethylenediamine,
N-benzyl-N-methyl-N'-2-4-benzylphenylcyclopropyl-
ethylenediamine,
N-benzyl-N-methyl-N'-2-3,4-methylenedioxyphenyl-
cyclopropylethylenediamine,
N-benzyl-N-methyl-N'-2-4-fluorophenylcyclopropyl-
ethylenediamine,
N-benzyl-N-methyl-N'-2-4-chlorobenzylphenylcyclo-
propylethylenediamine,
N-benzyl-N-methyl-N'-2-phenethylcyclopropylethyl-
enediamine,
N-benzyl-N-methyl-N'-2-allylcyclopropylethylene-
diamine,
N-benzyl-N-methyl-N'-2-propargylcyclopropylethyl-
enediamine,
N-benzyl-N-methyl-N'-2-1-butinylcyclopropylethyl-
enediamine,
N-benzyl-N-methyl-N'-2-ethinylcyclopropylethylene-
diamine,
N-benzyl-N-methyl-N'-2-ethenylcyclopropylethylene-
diamine,
N-benzyl-N-methyl-N'-2-1-propenylcyclopropylethyl-
enediamine,
N-benzyl-N-methyl-N'-2-3-butenylcyclopropylethylene-
diamine,
N-benzyl-N-methyl-N'-2-1-hexenylcyclopropylethyl-
enediamine,
N-benzyl-N-methyl-N'-2-phenylisopropylcyclopropyl-
ethylenediamine,
N - benzyl - N-methyl-N'-2-4-phenoxyphenylcyclopropyl-
ethylenediamine,
N-benzyl-N-methyl-N'-2-cinamylcyclopropylethyl-
enediamine,
N-benzyl-N-methyl-N'-2-2,4-dimethylphenylcyclo-
propylethylenediamine, and
N-benzyl-N-methyl-N'-2-4-trifluoromethylcinnamyl-
cyclopropylethylenediamine, respectively.

EXAMPLE 22

When, in the procedure of Example 6, α-chloro-N'-cyclopropylacetamide is replaced by an equal molar amount of N'-methyl-N'-cyclopropyl α-chloroacetamide,
N'-isopropyl-N'-cyclopropyl α-chloroacetamide,
N'-allyl-N'-cyclopropyl α-chloroacetamide,
N'-propargyl-N'-cyclopropyl α-chloroacetamide,
N'-phenethyl-N'-cyclopropyl α-chloroacetamide,
N'-butyl-N'-cyclopropyl α-chloroacetamide,
N'-ethinyl-N'-cyclopropyl α-chloroacetamide,
N'-cinnamyl-N'-cyclopropyl α-chloroacetamide,
N'-1-butinyl-N'-cyclopropyl α-chloroacetamide,
N'-1-propenyl-N'-cyclopropyl α-chloroacetamide,
N'methyl-N'-2-phenylcyclopropyl α-chloroacetamide,
N'-methyl-N'-2-3-trifluoromethylphenylcyclopropyl
α-chloroacetamide,
N'-allyl-N'-2-4-fluorophenylcyclopropyl
α-chloroacetamide,
N'-propargyl-N'-2-3,4-methylenedioxyphenylcyclopropyl
α-chloroacetamide,
N'-benzyl-N'-2-2-methylthiophenylcyclopropyl
α-chloroacetamide,
N'-methyl-N'-2-benzylcyclopropyl α-chloroacetamide,
N'-methyl-N'-2-4-trifluoromethylphenylcyclopropyl
α-chloroacetamide,
N'-benzyl-N'-2-benzylcyclopropyl α-chloroacetamide,
N'-methyl-N'-2-2,6-dichlorophenylcyclopropyl
α-chloroacetamide, and
N'-methyl-N'-2-2-methyl-4-trifluoromethylphenylcyclo-
propyl α-chloroacetamide, there are obtained, α-N-benzyl-N-methylamino-N'-methyl-N'-cyclopropyl-
acetamide,
α-N-benzyl-N-methylamino-N'-isopropyl-N'-cyclopro-
pylacetamide,
α-N-benzyl-N-methylamino-N'-allyl-N'-cyclopropyl-
acetamide,
α-N-benzyl-N-methylamino-N'-propargyl-N'-cyclopro-
pylacetamide,
α-N-benzyl-N-methylamino-N'-phenethyl-N'-cyclopro-
pylacetamide,
α-N-benzyl-N-methylamino-N'-butyl-N'-cyclopropyl-
acetamide,
α-N-benzyl-N-methylamino-N'-ethinyl-N'-cyclopro-
pylacetamide,
α-N-benzyl-N-methylamino-N'-cinnamyl-N'-cyclopropyl-
acetamide,
α-N-benzyl-N-methylamino-N'-1-butinyl-N'-cyclopropyl-
acetamide,
α-N-benzyl-N-methylamino-N'-1-propenyl-N'-cyclopro-
pylacetamide,
α-N-benzyl-N-methylamino-N'-methyl-N'-2-phenylcy-
clopropylacetamide,
α-N-benzyl-N-methylamino-N'-methyl-N'-2-3-trifluoro-
methylphenylcyclopropylacetamide,
α-N-benzyl-N-methylamino-N'-allyl-N'-2-4-fluorophenyl-
cyclopropylacetamide,
α-N-benzyl-N-methylamino-N'-propargyl-N'-2-3,4-
methylenedioxyphenylcyclopropylacetamide,
α-N-benzyl-N-methylamino-N'-benzyl-N'-2-2-methyl-
thiophenylcyclopropylacetamide,
α-N-benzyl-N-methylamino-N'-methyl-N'-2-benzylcyclo-
propylacetamide, α-N-benzyl-N-methylamino-N'-methyl-N'-2-4-trifluoromethylphenylcyclopropylacetamide,
α-N-benzyl-N-methylamino-N'-benzyl-N'-2-benzylcyclopropylacetamide,
α-N-benzyl-N-methylamino-N'-methyl-N'-2-2,6-dichlorophenylcyclopropylacetamide, and
α-N-benzyl-N-methylamino-N'-methyl-N'-2-2-methyl-4-trifluoromethylphenylcyclopropylacetamide, respectively.

EXAMPLE 23

When, in the procedure of Example 7, α-(N-benzyl-N-methyl)-amino-N'-cyclopropylacetamide is replaced by an equal molar amount of each of the products of Example 22, there are obtained, N-benzyl-N-methyl-N'-methyl-N'-cyclopropylethylenediamine,
N-benzyl-N-methyl-N'-isopropyl-N'-cyclopropylethylenediamine,
N-benzyl-N-methyl-N'-allyl-N'-cyclopropylethylenediamine,
N-benzyl-N-methyl-N'-propargyl-N'-cyclopropylethylenediamine,
N-benzyl-N-methyl-N'-phenethyl-N'-cycolpropylethylenediamine,
N-benzyl-N-methyl-N'-butyl-N'-cyclopropylethylenediamine,
N-benzyl-N-methyl-N'-ethinyl-N'-cyclopropylethylenediamine,
N-benzyl-N-methyl-N'-1-cinnamyl-N'-cyclopropylethylenediamine,
N-benzyl-N-methyl-N'-1-butinyl-N'-cyclopropylethylenediamine,
N-benzyl-N-methyl-N'-1-propenyl-N'-cyclopropylethylenediamine,
N-benzyl-N-methyl-N'-methyl-N'-2-phenylcyclopropylethylenediamine,
N-benzyl-N-methyl-N'-methyl-N'-2-3-trifluoromethylphenylcyclopropylethylenediamine,
N-benzyl-N-methyl-N'-allyl-N'-2-4-fluorophenylcyclopropylethylenediamine,
N-benzyl-N-methyl-N'-propargyl-N'-2-3,4-methylenedioxyphenylcyclopropylethylenediamine,
N-benzyl-N-methyl-N'-benzyl-N'-2-2-methylthiophenylcyclopropylethylenediamine,
N-benzyl-N-methyl-N'-methyl-N'-2-benzylcyclopropylethylenediamine,
N-benzyl-N-methyl-N'-methyl-N'-2-4-trifluoromethylphenylcyclopropylethylenediamine,
N-benzyl-N-methyl-N'-benzyl-N'-2-benzylcyclopropylethylenediamine,
N-benzyl-N-methyl-N'-methyl-N'-2-2,6-dichlorophenylcyclopropylethylenediamine, and
N-benzyl-N-methyl-N'-methyl-N'-2-2-methyl-4-trifluoromethylphenylcyclopropylethylenediamine, respectively.

EXAMPLE 24

When, in the procedure of Example 6, N-methylbenzylamine is placed by an equal molar amount of phenylamine,
4-trifluoromethylphenylamine,
N-methylphenylamine,
3-fluorobenzylamine,
4-trifluoromethylbenzylamine,
N-methyl-N-1-naphthylmethylamine,
N-methyl-N-3-thienylmethylamine,
N-methyl-N-3-furylmethylamine,
N-methyl-N-1-pyrrolylmethylamine,
N-methyl-N-2-pyridylmethylamine,
N-methyl-N-3-pyridylamine,
3-thienylamine,
N-benzyl-N-isopropylamine,
N-benzyl-N-hexylamine,
N-benzyl-N-allylamine,
N-benzyl-N-cyclopropylamine,
N-benzyl-N-cyclohexylamine,
N-benzyl-N-propargylamine,
N-benzyl-N-ethinylamine,
N-benzyl-N-1-propenylamine,
N-benzyl-N-ethenylamine,
N-phenethyl-N-methylamine,
N-cinnamyl-N-methylamine,
N-phenylisopropyl-N-methylamine,
N-phenylpropargyl-N-methylamine,
N-phenoxymethyl-N-methylamine,
N-phenylmercaptomethyl-N-methylamine,
N-phenoxymethylamine,
N-phenylmercaptoethylamine,
N-4-trifluoromethylbenzyl-N-methylamine,
4-chlorobenzylamine,
3-bromophenylamine,
N-2-iodobenzyl-N-cyclopropylamine,
N-4-fluorobenzyl-N-methylamine,
N-3-phenoxyphenyl-N-methylamine,
4-benzylbenzylamine,
N-2,3-methylenedioxyphenylmercapto-N-propargylamine,
3-dimethylsulfamylphenylamine,
4-methoxyphenylamine,
2-ethoxybenzylamine,
3-methylthiophenylamine,
N-4-methoxybenzyl-N-methylamine,
N-4-methylbenzyl-N-methylamine,
4-phenylphenylamine,
3-ethylphenylamine,
N-2-butylphenyl-N-ethenylamine,
2,6-dichlorobenzylamine,
N-3-chloro-4-methylphenyl-N-methylamine,
2-methyl-4-trifluoromethylbenzylamine,
N-methyl-N-proparglyamine,
N-ethinyl-N-propargylamine,
N-isopropyl-N-propargylamine,
N-allyl-N-propargylamine,
N-butenyl-N-propargylamine,
N-propargyl-N-propargylamine,
N-cyclopropyl-N-propargylamine,
N-methyl-N-ethinylamine, and
N-methyl-N-butinylamine, there are obtained, α-N-phenylamino-N'-cyclopropylacetamide,
α-N-4-trifluoromethylphenylamino-N'-cyclopropylacetamide,
α-N-methylphenylamino-N'-cyclopropylacetamide,
α-N-3-fluorobenzylamino-N'-cyclopropylacetamide,
α-N-4-trifluoromethylbenzylamino-N'-cyclopropylacetamide,
α-N-methyl-N-1-naphthylmethylamino-N'-cyclopropylacetamide,
α-N-methyl-N-3-thienylmethylamino-N'-cyclopropylacetamide,
α-N-methyl-N-3-furylmethylamino-N'-cyclopropylacetamide,
α-N-methyl-N-1-pyrrolylmethylamino-N'-cyclopropylacetamide,
α-N-methyl-N-2-pyridylmethylamino-N'-cyclopropylacetamide,
α-N-methyl-N-3-pyridylamino-N'-cyclopropylacetamide,
α-N-3-thienylamino-N'-cyclopropylacetamide,
α-N-benzyl-N-isopropylamino-N'-cyclopropylacetamide,
α-N-benzyl-N-hexylamino-N'-cyclopropylacetamide,
α-N-benzyl-N-allylamino-N'-cyclopropylacetamide,
α-N-benzyl-N-cyclopropylamino-N'-cyclopropylacetamide,
α-N-benzyl-N-cyclohexylamino-N'-cyclopropylacetamide,
α-N-benzyl-N-propargylamino-N'-cyclopropylacetamide,
α-N-benzyl-N-ethinylamino-N'-cyclopropylacetamide,
α-N-benzyl-N-1-propenylamino-N'-cyclopropylacetamide,
α-N-benzyl-N-ethenylamino-N'-cyclopropylacetamide,
α-N-phenethyl-N-methylamino-N'-cyclopropylacetamide, α-N-cinnamyl-N-methylamino-N'-cyclopropylacetamide,
α-N-phenylisopropyl-N-methylamino-N'-cyclopropylacetamide,
αN-phenylpropargyl-N-methylamino-N'-cyclopropylacetamide,
α-N-phenoxymethyl-N-methylamino-N'-cyclopropylacetamide,
α-N-phenylmercaptomethyl-N-methylamino-N'-cyclopropylacetamide,
α-N-phenoxymethylamino-N'-cyclopropylacetamide,
α-N-phenylmercaptoethylamino-N'-cyclopropylacetamide,
α-N-4-trifluoromethylbenzyl-N-methylamino-N'-cycloproplacetamide,
α-N-4-chlorobenzylamino-N'-cyclopropylacetamide,
α-N-3-bromophenylamino-N'-cyclopropylacetamide,
α-N-2-iodobenzyl-N-cyclopropylamino-N'-cyclopropylacetamide,
α-N-4-fluorobenzyl-N-methylamino-N'-cyclopropylacetamide,
α-N-3-phenoxyphenyl-N-methylamino-N'-cyclopropylacetamide,
αN-4-benzylbenzylamino-N'-cyclopropylacetamide,
α-N-2,3-methylenedioxyphenylmercapto-N-propargylamino-N'-cyclopropylacetamide,
α-N-3-dimethylsulfamylphenylamino-N'-cyclopropylacetamide,
α-N-4-methoxyphenylamino-N'-cyclopropylacetamide,
α-N-2-ethoxybenzylamino-N'-cyclopropylacetamide,
α-N-3-methylthiophenylamino-N'-cyclopropylacetamide,
α-N-4-methoxybenzyl-N-methylamino-N'-cyclopropylacetamide,
α-N-4-methylbenzyl-N-methylamino-N'-cyclopropylacetamide,
α-N-4-phenylphenylamino-N'-cyclopropylacetamide,
α-N-3-ethylphenylamino-N'-cyclopropylacetamide,
α-N-2-butylphenyl-N-ethenylamino-N'-cyclopropylacetamide,
α-N-2,6-dichlorobenzylamino-N'-cyclopropylacetamide,
α-N-3-chloro-4-methylphenyl-N-methylamino-N'-cyclopropylacetamide,
α-N-2-methyl-4-trifluoromethylbenzylamino-N'-cyclopropylacetamide,
α-N-methyl-N-propargylamino-N'-cyclopropylacetamide,
α-N-ethinyl-N-propargylamino-N'-cyclopropylacetamide,
α-N-isopropyl-N-propargylamino-N'-cyclopropylacetamide,
α-N-allyl-N-propargylamino-N'-cyclopropylacetamide,
α-N-butenyl-N-propargylamino-N'-cyclopropylacetamide,
α-N-propargyl-N-propargylamino-N'-cyclopropylacetamide,
α-N-cyclopropyl-N-propargylamino-N'-cyclopropylacetamide,
α-N-methyl-N-ethinylamino-N'-cyclopropylacetamide, and
α-N-methyl-N-butinylamino-N'-cyclopropylacetamide, respectively.

EXAMPLE 25

When, in the procedure of Example 7, α-(N-benzyl-N-methyl)amino-N'-cyclopropylacetamide is replaced by an equal molar amount of each of the products of Example 24, there are obtained, N-phenyl-N'-cyclopropylethylenediamine,
N-4-trifluoromethylphenyl-N'-cyclopropylethylenediamine,
N-methylphenyl-N'-cyclopropylethylenediamine,
N-3-fluorobenzyl-N'-cyclopropylethylenediamine,
N-4-trifluoromethylbenzyl-N'-cyclopropylethylenediamine,
N-methyl-N-1-naphthylmethyl-N'-cyclopropylethylenediamine,
N-methyl-N-3-thienylmethyl-N'-cyclopropylethylenediamine,
N-methyl-N-3-furylmethyl-N'-cyclopropylethylenediamine,
N-methyl-N-1-pyrrolylmethyl-N'-cyclopropylethylenediamine,
N-methyl-N-2-pyridylmethyl-N'-cyclopropylethylenediamine,
N-methyl-N-3-pyridyl-N'-cyclopropylethylenediamine,
N-3-thienyl-N'-cyclopropylethylenediamine,
N-benzyl-N-isopropyl-N'-cyclopropylethylenediamine,
N-benzyl-N-hexyl-N'-cyclopropylethylenediamine,
N-benzyl-N-allyl-N'-cyclopropylethylenediamine,
N-benzyl-N-cyclopropyl-N'-cyclopropylethylenediamine,
N-benzyl-N-cyclohexyl-N'-cyclopropylethylenediamine,
N-benzyl-N-propargyl-N'-cyclopropylethylenediamine,
N-benzyl-N-ethinyl-N'-cyclopropylethylenediamine,
N-benzyl-N-1-propenyl-N'-cyclopropylethylenediamine,
N-benzyl-N-ethenyl-N'-cyclopropylethylenediamine,
N-phenethyl-N-methyl-N'-cyclopropylethylenediamine,
N-cinnamyl-N-methyl-N'-cyclopropylethylenediamine,
N-phenylisopropyl-N-methyl-N'-cyclopropylethylenediamine,
N-phenylpropargyl-N-methyl-N'-cyclopropylethylenediamine,
N-phenoxymethyl-N-methyl-N'-cyclopropylethylenediamine,
N-phenylmercaptomethyl-N-methyl-N'-cyclopropylethylenediamine,
N-phenoxymethyl-N'-cyclopropylethylenediamine,
N-phenylmercaptoethyl-N'-cyclopropylethylenediamine,
N-4-trifluoromethylbenzyl-N-methyl-N'-cyclopropylethylenediamine,
N-4-chlorobenzyl-N'-cyclopropylethylenediamine,
N-3-bromophenyl-N'-cyclopropylethylenediamine,
N-2-iodobenzyl-N-cyclopropyl-N'-cyclopropylethylenediamine,
N-4-fluorobenzyl-N-methyl-N'-cyclopropylethylenediamine,
N-3-phenoxyphenyl-N-methyl-N'-cyclopropylethylenediamine,
N-4-benzylbenzyl-N'-cyclopropylethylenediamine,
N-2,3-methylenedioxyphenylmercapto-N-propargyl-N'-cyclopropylethylenediamine,
N-3-dimethylsulfamylphenyl-N'-cyclopropylethylenediamine,
N-4-methoxyphenyl-N'-cyclopropylethylenediamine,
N-2-ethoxybenzyl-N'-cyclopropylethylenediamine,
N-3-methylthiophenyl-N'-cyclopropylethylenediamine,
N-4-methoxybenzyl-N-methyl-N'-cyclopropylethylenediamine,
N-4-methylbenzyl-N-methyl-N'-cyclopropylethylenediamine,
N-4-phenylphenyl-N'-cyclopropylethylenediamine,
N-3-ethylphenyl-N'-cyclopropylethylenediamine,
N-2-butylphenyl-N-ethenyl-N'-cyclopropylethylenediamine,
N-2,6-dichlorobenzyl-N'-cyclopropylethylenediamine,
N-3-chloro-4-methylphenyl-N-methyl-N'-cyclopropylethylenediamine,
N-2-methyl-4-trifluoromethylbenzyl-N'-cyclopropylethylenediamine, N-methyl-N-propargyl-N'-cyclopropylethyl-
enediamine,
N-ethinyl-N-propargyl-N'-cyclopropylethyl-
enediamine,
N-isopropyl-N-propargyl-N'-cyclopropylethyl-
enediamine,
N-allyl-N-propargyl-N'-cyclopropylethyl-
enediamine,
N-butenyl-N-propargyl-N'-cyclopropylethyl-
enediamine,
N-propargyl-N-propargyl-N'-cyclopropylethyl-
enediamine,
N-cyclopropyl-N-propargyl-N'-cyclopropylethyl-
enediamine,
N-methyl-N-ethinyl-N'-cyclopropylethyl-
enediamine, and
N-methyl-N-butinyl-N'-cyclopropylethyl-
enediamine, respectively.

EXAMPLE 26

When, in the procedure of Example 6, α-chloro-N'-cyclopropylacetamide is replaced by an equal molar amount of α-chloro-N'-benzyl-N'-cyclopropylacetamide and N-methylbenzylamine is replaced by an equal molar amount of N-methyl-N-propargylamine,
N-ethinyl-N-propargylamine,
N-isopropyl-N-propargylamine,
N-allyl-N-propargylamine,
N-butenyl-N-propargylamine,
N-propargyl-N-propargylamine,
N-cyclopropyl-N-propargylamine,
N-methyl-N-ethinylamine, and
N-methyl-N-butinylamine, there are obtained, α-N-methyl-N-propargylamino-N'-benzyl-N'-
cyclopropylacetamide,
α-N-ethinyl-N-propargylamino-N'-benzyl-N'-
cyclopropylacetamide,
α-N-isopropyl-N-propargylamino-N'-benzyl-N'-
cyclopropylacetamide,
α-N-allyl-N-propargylamino-N'-benzyl-N'-
cyclopropylacetamide,
α-N-butenyl-N-propargylamino-N'-benzyl-N'-
cyclopropylacetamide,
α-N-propargyl-N-propargylamino-N'-benzyl-N'-
cyclopropylacetamide,
α-N-cyclopropyl-N-propargylamino-N'-benzyl-N'-
cyclopropylacetamide,
α-N-methyl-N-ethinylamino-N'-benzyl-N'-
cyclopropylacetamide, and
α-N-methyl-N-butinylamino-N'-benzyl-N'-
cyclopropylacetamide, respectively.

EXAMPLE 27

When, in the procedure of Example 7, α-(N-benzyl-N-methyl)amino-N'-cyclopropylacetamide is replaced by an equal molar amount of each of the products of Example 26, there are obtained, N-methyl-N-propargyl-N'-benzyl-N'-cyclopro-
pylethylenediamine,
N-ethinyl-N-propargyl-N'-benzyl-N'-cyclopro-
pylethylenediamine,
N-isopropyl-N-propargyl-N'-benzyl-N'-cyclopro-
pylethylenediamine,
N-allyl-N-propargyl-N'-benzyl-N'-cyclopro-
pylethylenediamine,
N-butenyl-N-propargyl-N'-benzyl-N'-cyclopro-
pylethylenediamine,
N-propargyl-N-propargyl-N'-benzyl-N'-cyclopro-
pylethylenediamine,
N-cyclopropyl-N-propargyl-N'-benzyl-N'-cyclopro-
pylethylenediamine,
N-methyl-N-ethinyl-N'-benzyl-N'-cyclopro-
pylethylenediamine, and
N-methyl-N-butinyl-N'-benzyl-N'-cyclopro-
pylethylenediamine, respectively.

EXAMPLE 28

Preparation of α-(N-cyclopropyl-N-benzyl)amino - N'-methylacetamide

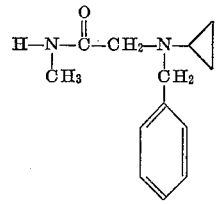

A benzene solution of α-chloro-N-methylacetamide (18.3 gm., 0.17 mol) was added dropwise to a refluxing mixture of N-cyclopropyl-N-benzylamine (25 gm., 0.17 mol) and 17.2 gm. of triethylamine in benzene and the reaction was allowed to proceed overnight. The solution was cooled, triethylamine·HCl was removed by filtration and the solution was concentrated in vacuo to yield 36.7 gm. of a residue. A portion of the crude amide, 3.0 gm., was distilled to give α-(N-cyclopropyl-N-benzyl)amino-N'-methylacetamide, B.P. 147–153°/0.07 mm. Hg. Yield 2.4 gm.

$\lambda_{max.}^{CHCl_3}$ 2.95, 6.03, 6.52μ

EXAMPLE 29

N-methyl-N'-benzyl-N'-cyclopropylethylenediamine

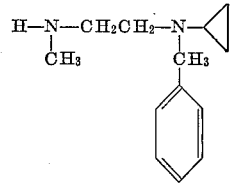

α-(N - cyclopropyl - N - benzyl)amino-N'-methylacetamide, 33.7 gm., was reduced with 10 gm. lithium aluminum hydride in tetrahydrofuran by refluxing overnight. Excess lithium aluminum hydride was destroyed with saturated $Na_2SO_4$ solution and the tetrahydrofuran was removed by distillation at atmospheric pressure. The residue was distilled to yield a liquid, N-methyl-N'-benzyl-N'-cyclopropylethylenediamine, B.P. 127–129.5°/mm.; yield, 32.2 gm.

$\lambda_{max.}^{film}$ No C=O

A dihydrochloride was prepared with 6.0 gm. of the diamine from ethanolic HCl. Removal of solvent gave a gum which was crystallized from ethanol-ether. The solid was recrystallized from ethanol-ether and dried in a desiccator. Yield, 5.5 gm. of N-methyl-N'-benzyl-N'-cyclopropylethylenediamine dihydrochloride, M.P. 145–148° C.

Analysis.—Calc'd for $C_{13}H_{22}N_2Cl_2$ (percent): C, 56.36; H, 8.01; N, 10.11; Cl, 25.60. Found (percent): C, 56.16; H, 8.04; N, 10.26; Cl, 25.80.

EXAMPLE 30

Preparation of N-methyl-N-propargyl-N'-benzyl-N'-cyclopropylethylenediamine

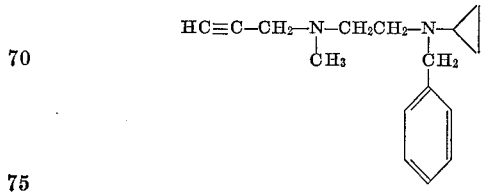

To a refluxing solution of N-methyl-N'-benzyl-N'-cyclopropylethylenediamine, 13.8 gm. (0.06 mol) in tetrahydrofuran was added 33 ml. of 2 N CH₃MgBr. When evolution of gas ceased, 7.2 gm. of propargyl bromide in 100 ml. of dry benzene was added dropwise. After 3 hours refluxing, the solution was cooled, 100 ml. water was added, and the benzene layer was decanted. The water layer was again extracted twice more with benzene and the benzene extracts were dried and made free of solvent. An oil, 16.7 gm., was obtained which was distilled to yield 8.0 gm. of N-methyl-N-propargyl-N'-benzyl-N'-cyclopropylethylenediamine; B.P. 99–114°/0.09 mm.

$\lambda_{max.}^{film}$ 3.05, 13.75, 14.40μ

A crystalline dihydrochloride was obtained from ethanolether and recrystallized from the same solvent system to yield 5.4 gm. of N-methyl-N-propargyl-N'-benzyl-N'-cyclopropylethylenediamine dihydrochloride; M.P. 171–174° C. with decomposition.

Thus, it is apparent from the foregoing description that the objects of this invention have been attained. Novel compounds have been invented which have antidepressant activity and inhibit monoamine oxidase. In addition, a novel method of treating depression has been invented.

While this invention has been described and exemplified in terms of its preferred embodiment, those skilled in the art will appreciate that modifications can be made without departing from the spirit and scope of this invention.

We claim:

1. A compound of the formula

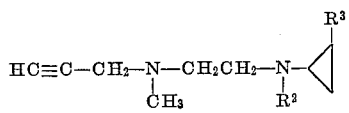

wherein

R² is a member selected from the group consisting of hydrogen (lower)alkyl, (lower)alkenyl, (lower)alkynyl, phenylalkyl, wherein the alkyl moiety contains from 1 to 4 carbon atoms, inclusive, and phenylalkenyl, wherein the alkenyl moiety contains from 2 to 4 carbon atoms, inclusive; and R³ is a member selected from the group consisting of hydrogen, (lower)alkyl, (lower)alkenyl, (lower)alkynyl, Ph-, Ph-alk-, and Ph-alken-, wherein alk represents a divalent alkylene radical containing from 1 to 4 carbon atoms, inclusive, alken represents a divalent alkenylene radical containing from 2 to 4 carbon atoms, inclusive, and Ph represents a radical of the formula

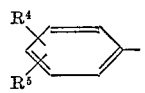

wherein

R⁴ and R⁵ are each a member selected from the group consisting of hydrogen, chloro, bromo, iodo, fluoro, trifluoromethyl, (lower)alkyl, (lower)alkoxy, (lower)alkylthio, phenyl, phenoxy, and benzyl;

and the pharmaceutically acceptable nontoxic salts thereof.

2. The compound of claim 1 having the formula

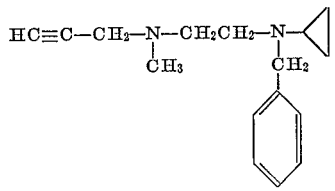

3. A pharmaceutically acceptable nontoxic salt of the compound of claim 2.

4. The compound of claim 1 having the formula

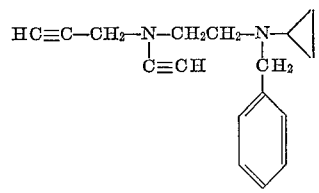

5. The compound of claim 1 having the formula

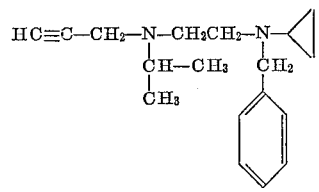

6. The compound of claim 1 having the formula

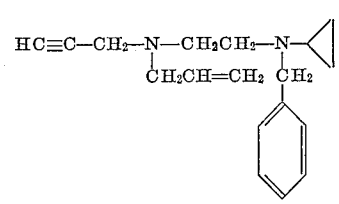

7. The compound of claim 1 having the formula

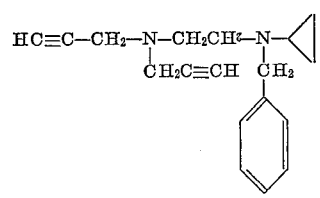

8. A compound of claim 1 having the formula

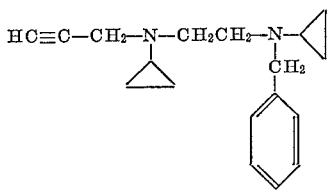

9. A compound of claim 1 having the name N-butenyl-N-propargyl-N'-benzyl-N'-cyclopropylethylenediamine.

10. A compound of claim 1 having the formula

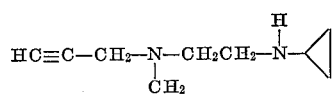

References Cited

UNITED STATES PATENTS 3,365,458  1/1968  Biel et al. _____ 260—570.5 X

ROBERT V. HINES, Primary Examiner

U.S. Cl. X.R.

260—294.8, 295.5, 296, 326.3, 326.82, 326.85, 329, 340.5, 347.2, 347.3, 347.7, 501.1, 556, 558, 561, 562, 570, 570.5, 570.7, 570.8, 570.9, 577, 583; 424—263, 274, 275, 278, 330

UNITED STATES PATENT OFFICE
CERTIFICATE OF CORRECTION

Patent No. 3,532,749     Dated October 6, 1970

Inventor(s) John H. Biel and Edward J. Warawa

It is certified that error appears in the above-identified patent and that said Letters Patent are hereby corrected as shown below:

In the Claims, Claim 10 should read:

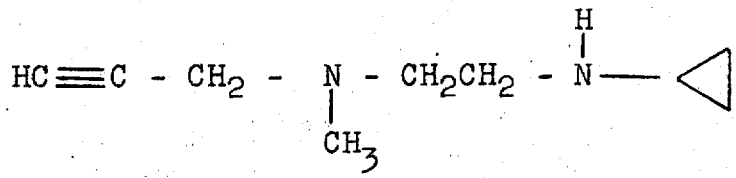

SIGNED AND SEALED
DEC 8 1970

(SEAL)
Attest:

Edward M. Fletcher, Jr.
Attesting Officer

WILLIAM E. SCHUYLER, JR.
Commissioner of Patents